United States Patent
Richards et al.

(10) Patent No.: US 12,483,679 B2
(45) Date of Patent: Nov. 25, 2025

(54) DISPLAYING DCI AND OTHER CONTENT ON AN ENHANCED DYNAMIC RANGE PROJECTOR

(71) Applicant: Dolby Laboratories Licensing Corporation, San Francisco, CA (US)

(72) Inventors: Martin J. Richards, Gig Harbor, WA (US); Douglas J. Gorny, Pacifica, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 18/317,561

(22) Filed: May 15, 2023

(65) Prior Publication Data

US 2023/0291878 A1 Sep. 14, 2023

Related U.S. Application Data

(63) Continuation of application No. 17/473,952, filed on Sep. 13, 2021, now Pat. No. 11,677,917, which is a (Continued)

(51) Int. Cl.
H04N 9/31 (2006.01)
H04N 9/67 (2023.01)

(52) U.S. Cl.
CPC ......... *H04N 9/3182* (2013.01); *H04N 9/3126* (2013.01); *H04N 9/67* (2013.01)

(58) Field of Classification Search
CPC ....... H04N 9/67; H04N 9/3126; H04N 9/3187
See application file for complete search history.

(56) References Cited

U.S. PATENT DOCUMENTS 6,069,609 A    5/2000    Ishida
6,416,888 B1*    7/2002    Kawamura ......... H10K 50/171
                                            313/506

(Continued)

FOREIGN PATENT DOCUMENTS

JP    H1173162 A    7/1989
JP    08-23500    1/1996

(Continued)

OTHER PUBLICATIONS

Reference chart of Image Parameters and Tolerances, as published in the "Digital Cinema System Specification", version 1.2 published Mar. 7, 2008. (The New DCI Specification, Version 1.2 with Errata as of Aug. 30, 2012, Incorporated, dated Oct. 10, 2012, incorporates the 96 erratum previously released for Version 1.2 of the DCI Specification that was dated Mar. 7, 2008.).

*Primary Examiner* — Brian P Yenke

(57) ABSTRACT

Systems and methods of rendering DCI-compliant image data on Enhanced Dynamic Range (EDR) display systems are disclosed. One embodiment of an EDR projector system comprises a first modulator and a second modulator. One method for rendering DCI-compliant image data on an EDR projector system comprises: receiving input image data, said image data comprising a plurality of image formats; determining whether the input image data comprises DCI image data; if the input image data comprises DCI image data, then performing dynamic range (DR) processing on the DCI image data; and rendering the dynamic range processed DCI image data on the EDR projector system. One DR processing method is to set the first modulator to a desired luminance level—e.g., fully ON or a ratio of DCI max luminance to the EDR max luminance. In addition, a desired minimum level of luminance may be set for the EDR projector.

20 Claims, 7 Drawing Sheets

Related U.S. Application Data continuation of application No. 16/449,647, filed on Jun. 24, 2019, now Pat. No. 11,122,244, which is a continuation of application No. 15/025,536, filed as application No. PCT/US2014/058905 on Oct. 2, 2014, now Pat. No. 10,368,044.

(60) Provisional application No. 61/889,322, filed on Oct. 10, 2013.

(56) References Cited

U.S. PATENT DOCUMENTS

| | | | |
|---|---|---|---|
| 6,606,168 B1 | 8/2003 | Rylander | |
| 6,891,672 B2 | 5/2005 | Whitehead | |
| 6,923,546 B2 | 8/2005 | Kurematsu | |
| 7,154,557 B2 | 12/2006 | Itoh | |
| 7,304,597 B1 | 12/2007 | LaMarche | |
| 7,420,709 B2 | 9/2008 | Damera-Venkata | |
| 7,551,341 B1 | 6/2009 | Ward | |
| 8,125,702 B2 | 2/2012 | Ward | |
| 8,684,533 B2 | 4/2014 | Whitehead | |
| 8,698,701 B2 | 4/2014 | Margulis | |
| 8,774,553 B1 | 7/2014 | Winn | |
| 8,866,975 B1* | 10/2014 | Chen | H04N 19/44 345/590 |
| 8,891,863 B2 | 11/2014 | Ninan | |
| 8,928,686 B2 | 1/2015 | Messmer | |
| 8,932,438 B2 | 1/2015 | Tsunekawa | |
| 9,022,582 B2 | 5/2015 | Kang | |
| 9,264,681 B2 | 2/2016 | Gish | |
| 9,509,935 B2 | 11/2016 | Wilson | |
| 9,584,748 B2 | 2/2017 | Saito | |
| 9,584,784 B2 | 2/2017 | Shields | |
| 9,654,701 B2 | 5/2017 | Kunkel | |
| 9,832,438 B2 | 11/2017 | Shields | |
| 9,918,052 B2* | 3/2018 | Richards | H04N 5/7458 |
| 9,955,132 B2 | 4/2018 | Shields | |
| 9,958,762 B2 | 5/2018 | Gorny | |
| 9,992,460 B2 | 6/2018 | Shields | |
| 10,171,779 B2 | 1/2019 | Kozak | |
| 10,234,754 B2 | 3/2019 | Gorny | |
| 10,257,477 B2 | 4/2019 | Richards | |
| 10,341,622 B2 | 7/2019 | Richards | |
| 10,368,044 B2 | 7/2019 | Richards | |
| 10,386,709 B2* | 8/2019 | Richards | G03B 21/208 |
| 10,694,157 B2* | 6/2020 | Shields | B65B 61/06 |
| 10,855,960 B2* | 12/2020 | Richards | G09G 3/346 |
| 11,122,244 B2* | 9/2021 | Richards | H04N 9/3126 |
| 11,582,432 B2* | 2/2023 | Shields | B65B 49/08 |
| 11,611,728 B2* | 3/2023 | Damberg | H04N 9/3126 |
| 11,677,917 B2* | 6/2023 | Richards | H04N 9/3182 348/646 |
| 11,765,326 B2* | 9/2023 | Richards | H04N 9/3164 353/122 |
| 11,838,692 B2* | 12/2023 | Shields | H04N 9/3123 |
| 12,207,026 B2* | 1/2025 | Shields | G03B 21/13 |
| 2004/0001184 A1 | 1/2004 | Gibbons | |
| 2006/0007460 A1 | 1/2006 | Bogdanowicz | |
| 2006/0103883 A1 | 5/2006 | Damera-Venkata | |
| 2006/0268991 A1 | 11/2006 | Segall | |
| 2007/0091410 A1* | 4/2007 | Lerner | H04N 9/317 348/E9.027 |
| 2008/0095464 A1* | 4/2008 | Goertzen | H04N 19/597 348/E13.071 |
| 2008/0192155 A1 | 8/2008 | Uchiyama | |
| 2008/0266488 A1 | 10/2008 | Watanabe | |
| 2009/0034867 A1 | 2/2009 | Rempel | |
| 2009/0225234 A1 | 9/2009 | Ward | |
| 2009/0243506 A1 | 10/2009 | Bremer | |
| 2009/0244703 A1 | 10/2009 | Asakura | |
| 2010/0110285 A1 | 5/2010 | Nobori | |
| 2010/0245726 A1 | 9/2010 | Utsumi | |
| 2010/0265264 A1* | 10/2010 | Doser | H04N 21/23439 382/167 |
| 2011/0149167 A1 | 6/2011 | Ferguson | |
| 2011/0194618 A1 | 8/2011 | Gish | |
| 2012/0038693 A1 | 2/2012 | Kang | |
| 2012/0044281 A1* | 2/2012 | Kang | G09G 3/3413 345/690 |
| 2012/0314944 A1 | 12/2012 | Ninan | |
| 2012/0327139 A1 | 12/2012 | Margulis | |
| 2013/0038790 A1 | 2/2013 | Robin | |
| 2013/0076763 A1 | 3/2013 | Messmer | |
| 2013/0093647 A1* | 4/2013 | Curtis | G06F 3/1446 345/1.3 |
| 2013/0114000 A1 | 5/2013 | Atkins | |
| 2013/0147777 A1 | 6/2013 | Lau | |
| 2013/0148029 A1 | 6/2013 | Gish | |
| 2013/0148037 A1 | 6/2013 | Whitehead | |
| 2013/0308697 A1 | 11/2013 | Fukuhara | |
| 2014/0022460 A1 | 1/2014 | Li | |
| 2014/0327885 A1 | 11/2014 | Mansur | |
| 2014/0333835 A1 | 11/2014 | Richards | |
| 2015/0124175 A1* | 5/2015 | Perkins | G02B 17/008 348/759 |
| 2015/0248747 A1 | 9/2015 | Atkins | |
| 2016/0005349 A1* | 1/2016 | Atkins | H04N 9/68 345/591 |
| 2016/0191880 A1 | 6/2016 | Shields | |
| 2016/0241828 A1 | 8/2016 | Richards | |
| 2016/0286178 A1 | 9/2016 | Shields | |
| 2017/0078629 A1 | 3/2017 | Kozak | |
| 2017/0150107 A1 | 5/2017 | Kozak | |
| 2017/0171522 A1 | 6/2017 | Shields | |
| 2017/0223367 A1 | 8/2017 | Stessen | |
| 2017/0324887 A1 | 11/2017 | Min | |
| 2018/0070064 A1 | 3/2018 | Shields | |
| 2018/0217485 A1 | 8/2018 | Gorny | |
| 2018/0295330 A1 | 10/2018 | Shields | |
| 2019/0089956 A1 | 3/2019 | Stessen | |
| 2019/0124304 A1 | 4/2019 | Kozak | |
| 2019/0171095 A1 | 6/2019 | Gorny | |
| 2019/0311694 A1* | 10/2019 | Van Mourik | H04N 9/67 |
| 2019/0313067 A1* | 10/2019 | Richards | H04N 9/3182 |
| 2020/0105221 A1* | 4/2020 | Marcu | G06T 5/92 |
| 2021/0047061 A1* | 2/2021 | Shields | G03B 21/005 |
| 2022/0070423 A1* | 3/2022 | Richards | H04N 9/67 |
| 2023/0027499 A1* | 1/2023 | Kozak | H04N 13/363 |
| 2023/0188686 A1* | 6/2023 | Shields | B65B 49/08 345/204 |
| 2023/0368489 A1* | 11/2023 | Zhang | H04N 21/25825 |

FOREIGN PATENT DOCUMENTS

| | | |
|---|---|---|
| JP | 2001-305649 | 11/2001 |
| JP | 2002281518 A | 9/2002 |
| JP | 2005-284251 | 10/2005 |
| JP | 2005274995 A | 10/2005 |
| JP | 2007206343 | 8/2007 |
| JP | 2008035306 A | 2/2008 |
| JP | 2009156898 | 7/2009 |
| JP | 2011514546 A | 5/2011 |
| JP | 2012-047827 | 3/2012 |
| JP | 2012519882 | 8/2012 |
| JP | 2013101344 | 5/2013 |
| JP | 2018098817 A | 6/2018 |
| WO | 0203687 | 1/2002 |
| WO | 2007024313 | 3/2007 |
| WO | 2009097256 | 8/2009 |
| WO | 2011017062 | 2/2011 |
| WO | 2012012446 | 1/2012 |
| WO | 2012142285 | 10/2012 |
| WO | 2013046095 | 4/2013 |
| WO | 2015023762 | 2/2015 |

* cited by examiner

DISPLAYING DCI AND OTHER CONTENT ON AN ENHANCED DYNAMIC RANGE PROJECTOR

CROSS REFERENCE TO RELATED APPLICATIONS

This application is a continuation of U.S. patent application Ser. No. 17/473,952, filed Sep. 13, 2021, which is a continuation of U.S. patent application Ser. No. 16/449,647 filed on Jun. 24, 2019, (now U.S. Pat. No. 11,122,244, issued Sep. 14, 2021), which is a continuation of U.S. patent application Ser. No. 15/025,536, filed on Mar. 28, 2016, (now U.S. Pat. No. 10,368,044, issued Jul. 30, 2019), which is the 371 national stage of PCT Application No. PCT/US2014/058905, filed Oct. 2, 2014, which claims priority to U.S. Provisional Patent Application No. 61/889,322, filed on Oct. 10, 2013, each of which is hereby incorporated by reference in its entirety.

TECHNICAL FIELD

The present invention relates to displays systems and, more particularly, to Enhanced Dynamic Range (EDR) projection display systems.

BACKGROUND

The Digital Cinema Initiative (DCI) is a joint venture of major motion picture studios, started in March 2003. DCI's primary purpose was to develop and promote specifications for an emerging digital cinema market. These specifications include a set of content requirements to enable compatibility and interoperability.

Among the various parts of the "Digital Cinema System Specification" first released on Jul. 20, 2005 (and subsequently updated periodically), there is a set of performance specifications for the projection systems and/or its content regarding color space, resolution, brightness, contrast and interfaces.

As the technology of projector systems progress, however, the performance of today's most advanced projectors may well outperform the projector systems as specified in the DCI specifications.

SUMMARY

The present invention provides for the preparation and display content on advanced high performance projectors and other displays. Such displays include various embodiments of large format, wide color gamut, and high dynamic range cinema projectors and other displays. Such projectors are desirably utilized in all cinema applications including traditional theater movie houses and multiplexes, television, closed circuit applications, live concerts, sporting events, theme parks, billboard advertising, and professional applications of all types including industrial design systems, cinema post-production, graphic arts, publishing, etc. Such displays typically have a contrast ratio that exceeds typical cinema standards or modern displays including contrast ratios of more than 5,000 to 1 and may be 1,000,000 to 1 and higher in some circumstances. Such displays typically have a color gamut that exceeds current cinema standards. Providing and displaying content for several embodiments of display systems and methods of their manufacture and use are herein disclosed.

Systems and methods of rendering DCI-compliant image data on Enhanced Dynamic Range (EDR) and other high performance display systems are disclosed. One embodiment of an EDR projector system comprises a first modulator and a second modulator. Other embodiments may provide increased resolution modulators with any of laser light sources, content enhancements including resolution and/or frequency domain processing and projection of modified sub-frames in parallel (e.g., multiple projectors) or alternating manners (in single or multiple projector modes).

In one embodiment, a method for rendering DCI-compliant image data on an EDR projector system comprises: receiving input image data, said image data comprising a plurality of image formats; determining whether the input image data comprises DCI image data; if the input image data comprises DCI image data, then performing dynamic range (DR) processing on the DCI image data; and rendering the dynamic range processed DCI image data on the EDR projector system. One DR processing method is to set the first modulator to a desired luminance level—e.g., fully ON or a ratio of DCI max luminance to the EDR max luminance. In addition, a desired minimum level of luminance may be set for the EDR projector.

In another embodiment, a multi-modulation projector display system comprises: a light source; a controller; a first modulator, said first modulator being illuminated by said light source and said first modulator comprising a plurality of analog mirrors to modulate light from the light source; a second modulator, said second modulator being illuminated by light from said first modulator and capable of modulating light from said first modulator, and said second modulator comprising a plurality of mirrors; said controller further comprising: a processor; a memory, said memory associated with said processor and said memory further comprising processor-readable instructions, such that when said processor reads the processor-readable instructions, causes the processor to perform the following instructions: receiving input image data, said image data comprising at least one highlight feature; determining whether the input image data comprises DCI image data; if the input image data comprises DCI image data, performing dynamic range processing on the DCI image data; and rendering the dynamic range processed DCI image data on the EDR projector system.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
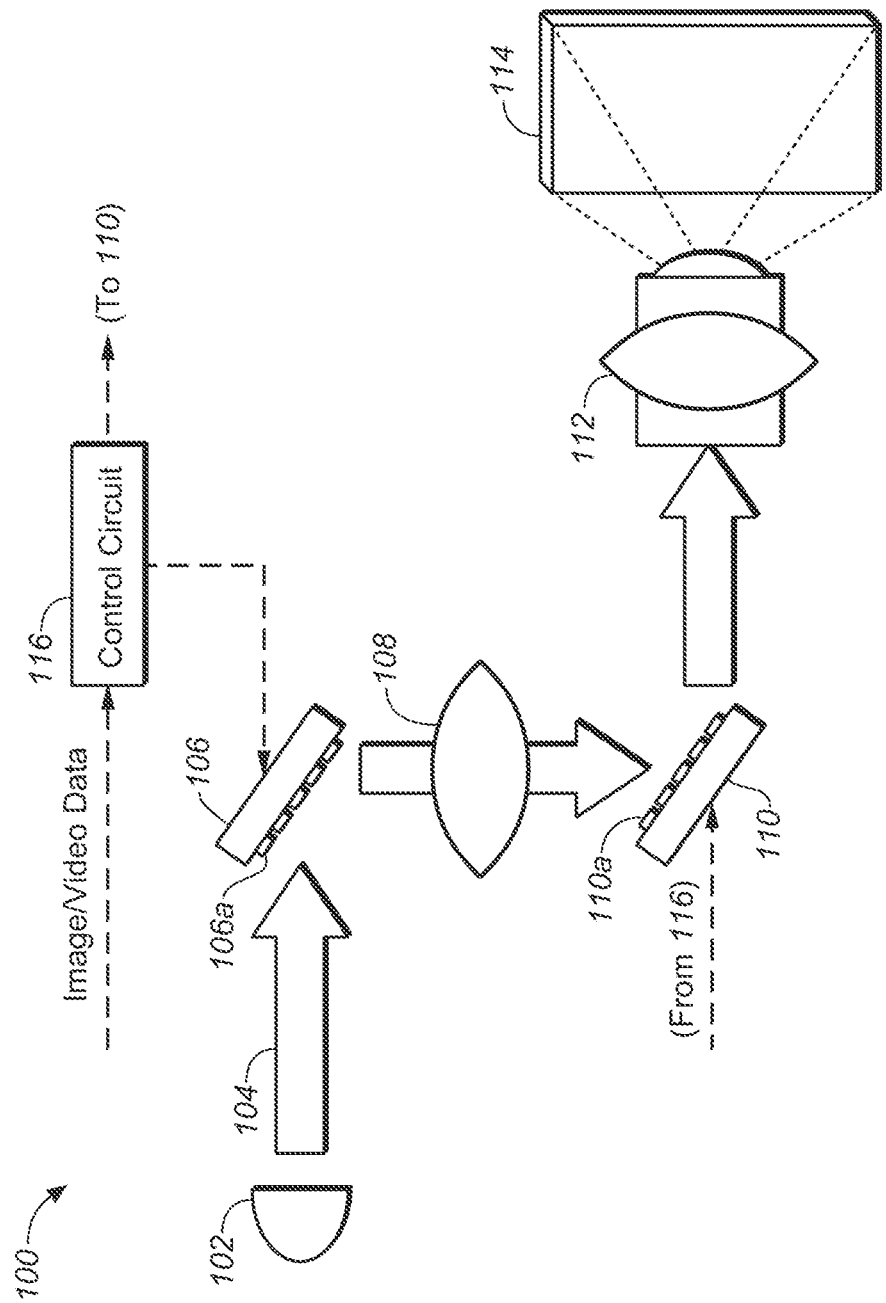
FIG. 1 depicts one embodiment of an EDR projector display system that may be suitable for the systems, methods and techniques of the present application disclosed herein.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

INTRODUCTION

Enhanced Dynamic Range (EDR) projection systems have significantly improved performance as compared to a standard DCI (Digital Cinema Initiative) projector. Display of standard DCI content is designed and graded for projectors that meet the DCI projector specification. These projectors have a more limited dynamic range and color space than the EDR projector. In order to properly display DCI content without artifacts (e.g., dark noise, dark contouring etc.) the EDR projector should have a "DCI Mode" that provides an experience that is identical, or at least similar to the standard DCI projector. It may be desirable to provide an improved experience, but it must be without any objectionable artifacts, and be in line with the artistic intent of the content creator.

To give some idea of the need to match performance between DCI and EDR projectors, Table 1 below is the Reference Chart of Image Parameters and Tolerances, as published in the "Digital Cinema System Specification", Version 1.2 published Mar. 7, 2008:

TABLE 1

DCI IMAGE PARAMETER AND TOLERANCES

| Image Parameters | Nominal (Projected Image) | Tolerances (Review Rooms) | Tolerances (Theatrical) |
|---|---|---|---|
| Pixel Count | 2048 × 1080 or 4096 × 2160 | N/A | N/A |
| Luminance Uniformity, corners and sides | 85% of center | 80% to 90% of center | 70% to 90% of center |
| Calibrated White Luminance, center | 48 cd/m$^2$ (14 fL) | ±2.4 cd/m$^2$ (±0.7 fL) | ±10.2 cd/m$^2$ (±3.0 fL) |
| Calibrated White Chromaticity, center from code values [3794 3960 3890] | x = .3140, y = .3510 | ±.002 x, y | ±.006 x, y |
| Color Uniformity of White Field, corners | Matches center | ±.008 x, y Relative to center | ±.010 x, y Relative to center |
| Sequential Contrast | 2000:1 minimum | 1500:1 minimum | 1200:1 minimum |
| Intra-frame Contrast | 150:1 minimum | 100:1 minimum | 100:1 minimum |
| Grayscale Tracking | No visible color shading | No visible color shading | No visible color shading |
| Contouring | Continuous, smooth ramp, with no visible steps | (same) | (same) |
| Transfer Function | Gamma 2.6 | ±2% 10 Per component | ±5% 11 Per component |
| Color Gamut | Minimum Color Gamut enclosed by white point, black point11 and Red: 0.680 x, 0.320 y, 10.1 Y Green: 0.265 x, 0.690 y, 34.6 Y Blue: 0.150 x, 0.060 y, 3.31 Y | (same) | (same) |
| Color Accuracy | Colorimetric Match | +/−4 delta E12 | +/−4 delta E12 |

By contrast, EDR projector systems have larger color spaces and dynamic ranges than that specified above for a (perhaps minimally) compatible DCI projector.

In many embodiments disclosed herein, novel dual modulator, triple modulator and other multi-modulator projection display systems and techniques may be employed for inputting DCI content into such EDR projectors and converting such content and rendering video and/or image data—at or beyond the DCI specifications.

Many embodiments employ a combination of a MEMS array as a first (or early) stage modulator that projects an intermediate illumination onto a second (or later) stage DMD modulator.

EDR Dual-Modulator Projector Embodiments

EDR projector systems and dual modulation projector systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";

(2) United States Patent Application 20130148037 to Whitehead et al., published on Jun. 13, 2013 and entitled "PROJECTION DISPLAYS";

(3) United States Patent Application 20130147777 to Lau et al., published on Jun. 13, 2013 and entitled "APPLICATION OF MEMS PIXELS IN DISPLAY AND IMAGING DEVICES"; and (4) United States Patent Application 20120038693 to Kang et al., published on Feb. 16, 2012 and entitled "HIGH DYNAMIC RANGE PROJECTION SYSTEM".

which are hereby incorporated by reference in their entirety.

Many dual, triple, more than 2-modulation (all of which are hereinafter referred to as "multi-modulation") display systems are disclosed herein use beam steering to put light on the modulation chips only where needed.

FIG. 1 is one embodiment of a dual modulating projector display system 100, comprising two or more digital projectors (as modulators). FIG. 1 shows a monochrome display 100 according to this example embodiment. Display 100 comprises a light source 102. Light 104 from light source 102 illuminates a first light modulator 106. Light source 102 may comprise, for example: a laser; a xenon lamp; an array of lasers (e.g., diodes or otherwise) or other solid-state light emitters; an arc lamp; or the like.

In one embodiment, the first light modulator 106 may comprise a plurality of controllable elements 106a—e.g., on a fast switching devices, such as a MEMS device or the like. As will be described in greater detail below (and in reference to FIGS. 2A-B and FIGS. 3A-C), elements 106a may be selected such that they may be steered to reflect light to a second modulator 110 by a suitable control circuit/controller 116. The controller 116 may comprise a processor, a memory in communication with the processor and such that the memory may comprise instructions such that the controller may suitably control first modulator and second modulator (and other modulators, if they are in the system at issue) to perform the highlighting techniques as described herein.

The set of controllable elements may also comprises a set of controllable analog mirrors—possibly with switching speeds sufficiently responsive to provide subframe rendering for processing highlights as described herein. In one embodiment, the switching response time of elements 106a may be fast enough—so as to reflect light onto the second modulator several times in a given frame of image data. For example, elements 106a may affect a half frame, third frame, a quarter frame, or 1/n frame illumination onto second modulator 110, as desired.

Light from first modulator 106 may pass through an optical system 108—which may comprise sufficient optical components to perform a desired point spread function (PSF) of illumination onto second modulator 110. Depending on the ratio of elements 106a in first modulator 106 to elements 110a in second modulator 110, the desired PSF may vary accordingly. For example, if the first modulator 106 is a MEMS array and second modulator 110 is a DMD array, a typical MEMS array has many less elements 106a (e.g., range from a few hundred to a few thousand mirror elements, 100 to 2-3K)—than a DMD array that may be a few million mirror elements thereon (e.g. over 500K mirrors and over).

Second light modulator 110 may be controlled by control circuit 116 (as first light modulator 106 may be) and comprise a plurality of controllable elements 110a. Each controllable element 110a can be controlled to select a proportion of the light that is incident on the element 110a from first spatial light modulator 106 that is transmitted to a viewing area 114 (through, possibly a second optical system 112).

In some embodiments, second spatial light modulator 110 comprises optical reflective or transmissive elements 110a that can be switched between ON and OFF states, e.g., a DMD device. In such embodiments, second spatial light modulator 110 may be controlled by a controller that sets its elements to be ON or OFF.

Transfer optics 108 carries light from first light modulator 106 to second light modulator 110. This light is capable of illuminating the entire active area of second light modulator 110 when all elements 106a of first spatial light modulator 106 are ON. This light could spread past the edges of second spatial light modulator 110. Transfer optics 108 may blur the light. Transfer optics 108 may be characterized by a transfer function which at least approximates how light issuing from a point on first spatial light modulator 106 will be spread over second spatial light modulator 110. The pattern of light incident on second light modulator 110 can be estimated or determined from the configuration of first modulator 106 (i.e. from which elements 106a are ON and which elements 106a are OFF) and the transfer function. A suitable projection lens 112 focuses light from second spatial light modulator 110 onto a screen 114 for viewing. Screen 114 may comprise a front-projection screen or a rear-projection screen.

Although the embodiment of FIG. 1 depicts a single light channel, it will be appreciated that the first and second modulators may be replicated for each of a series of color channels within the projector such that each color channel includes 2 optically offset reflective modulators. The series of color channels may comprise a red channel, a green channel, and a blue channel. The light source may comprise, for example, a plurality of colored laser light sources. In one embodiment, the light sources may be modulated either globally (in brightness) and/or spatially (locally) dimmed according to signals (not shown) from a controller (e.g., 116).

The intermediate signals to the second modulator may be, for example, based on a light field simulation comprising a point spread function of light reflected by the first modulator and the offset. For example, the intermediate signals to the second modulator may be based on a point spread function of light reflected by the first modulator in each channel and the offset in each channel. The offset in the channels may be the same, or the offset of at least two channels is different and the intermediate signals to second modulator in each channel is based on at least one of the offset and differences in offset between channels.

Another Multi-Modulator Embodiment

Figure 2:
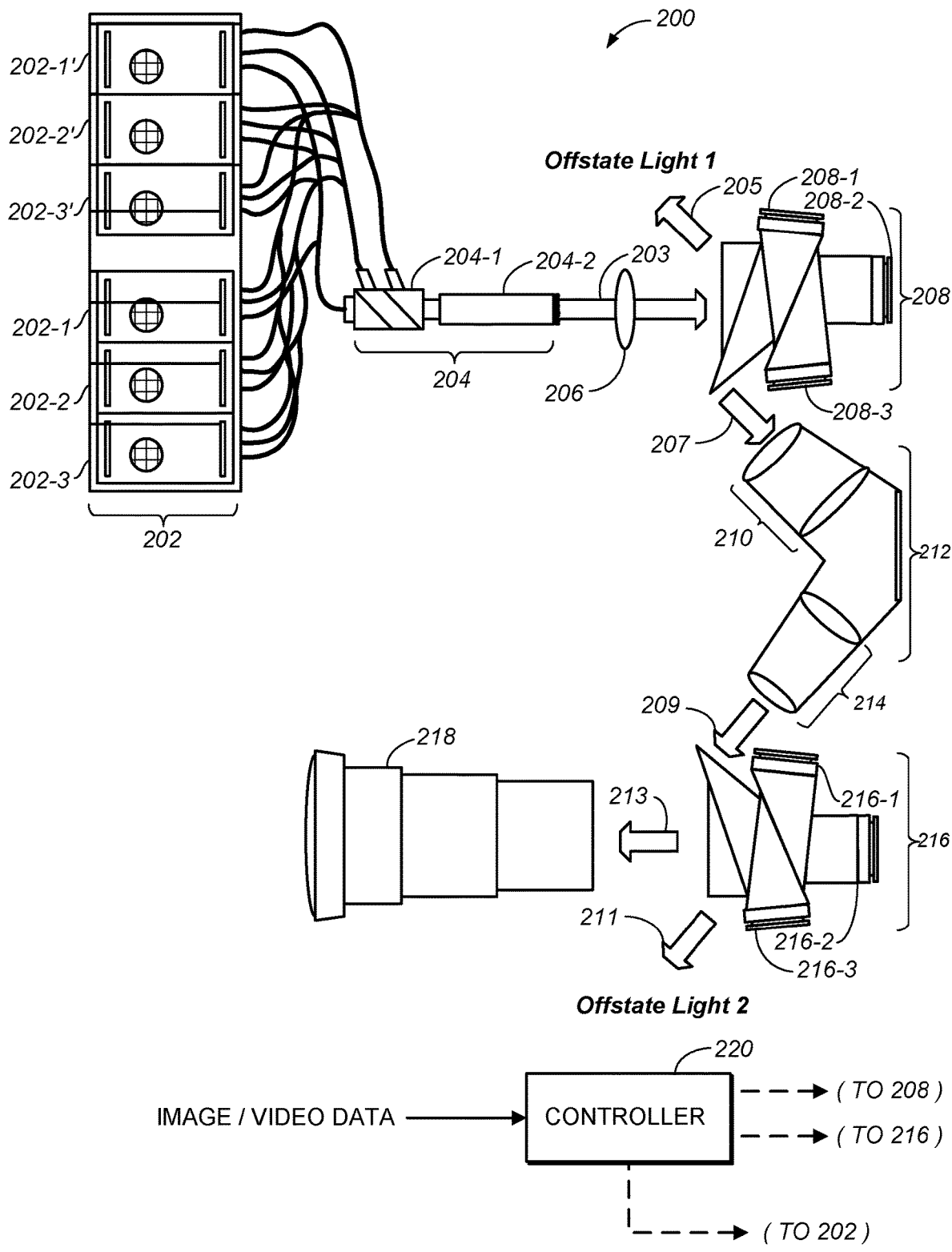
FIG. 2 depicts another embodiment of an EDR projector display system that may be suitable for the systems, methods and techniques of the present application disclosed herein.

FIG. 2 is another embodiment of a dual modulating projector display system 200 suitable for the purposes of the present application. Display 200 may comprise a light source 202—which may comprise one light source (e.g. lamp or the like) or a plurality of point sources of light (e.g., lasers, LEDs or the like). In the context of a digital movie projector, light source 202 in FIG. 2 may comprise one or more banks of laser light sources (e.g., 202-1, 202-2, 202-3; 202-1', 202-2', 202-3'— where there may be a plurality of colored light sources that when combined may render a white light—e.g., red, green and blue).

Light from source 202 may be piped into optical stage 204—which may comprise a combiner 204-1 to combine the light from the RGB laser sources and integrating rod 204-2 which may improve the uniformity of the light. Light 203 may thereafter be transmitted through a diffuser 206 to provide angular diversity to the light. First modulator/premodulator 208 may input this light and—under control of controller 220—may provide pre-modulator image processing, as described further herein.

In one embodiment (and as shown in FIG. 2), first, pre-modulator 208 may be a DMD array that—through a set of optical elements may process separate color channels (e.g., 208-1, 208-2 and 208-3 for, e.g., red, green and blue channels). For merely exemplary purposes, pre-modulator 208 may be a 1.2", 2K mirror DMD, using standard prism design. Pre-modulator 208 may be controlled to display a binary half-tone image—e.g., where the pixels are full ON or OFF (where light in the OFF state may be dumped to offstate light 205). In other embodiments, analog Micro-Electro Mechanical System (MEMS) and/or other analog and/or digital reflectors may be suitably controlled to redistribute light to form a different type of image.

In one embodiment, the pre-modulator/halftone DMD may spatially modulate the uniform light field to produce a halftone image;—e.g., in which all pixels are either ON or OFF for the entire frame time or a portion thereof. The resulting halftone image—appropriately blurred—may produce sufficient light levels on the primary modulator/pulse-width DMD, especially if bright-clipping is desired to be avoided. Since the pulse-width DMD may only reduce light levels, the blurred halftone image should be substantially everywhere greater than the desired screen image—e.g., the input image. In some circumstances when an image feature such as a very bright dot on a black background may force the unavoidable condition of choosing either bright or dark-clipping, some bright-clipping may be intentionally allowed and the blurred halftone image would not be greater than the input, particularly the dot.

In one embodiment, to achieve low light levels and to avoid halos, the blurred halftone image may be set to be slightly greater than the desired screen image. So, the blurred halftone image may substantially be a bandlimited minimum upper-bound on the desired screen image—e.g., with the bandwidth limited by the optical blur. One embodiment (as follows) tends to produce a bandlimited upper-bound on an image. It may not be a minimum upper-bound, but may have a similar performance. This relaxation may be desirable as a true minimum may be harder to achieve, although possible. In this embodiment, it may suffice that the "no bright clipping" property is substantially preserved.

In this embodiment, the halftone image may be formed by using a spatial dither pattern. The dither pattern may be defined over a rectangular block of pixels and may be repeated over the entire image frame by tiling the pattern. The size of the pattern may be related to the size of the blur kernel, since the kernel smoothes the pattern. The size of the kernel may also determine the minimum non-zero light level—e.g., one pixel of the dither pattern turned ON and all others OFF may produce the minimum level. Further information on this projector system embodiment is disclosed in co-owned U.S. Patent Application No. 61/866,704 and entitled "SYSTEMS AND METHODS FOR LIGHT FIELD MODELING TECHNIQUES FOR MULTI-MODULATION DISPLAYS", filed on 16 Aug. 2013—and which is hereby incorporated by reference in its entirety.

This half tone image 207 may be transmitted through a Point Spread Function (PSF) optic stage 212. PSF optical stage may comprise many different optical elements 210, 214 or the like—e.g., lenses, diffusers, reflectors or the like. It will suffice for the purposes of the present application that PSF optic stage receives the half-tone image from the pre-modulator 208 and provide a desired defocusing of the half-tone image (209) to the second modulator/prime modulator 216. As with first modulator 208, second modulator may be a DMD array that—through a set of optical elements may process separate color channels (e.g., 216-1, 216-2 and 216-3 for, e.g., red, green and blue channels). For merely another exemplary purposes, pre-modulator 208 may be a 1.4", 4K mirror DMD, using standard prism design.

Prime modulator 216 may receive light 209 and may be controlled by controller 220. Controller 220 may employ a light field simulation that estimates and/or models the combined effect of half-toning and PSF to determine local brightness on the prime modulator 216 on a pixel-by-pixel basis. In other embodiments, such as those employing MEMS reflectors, controller 220 may similarly model the light field formation. From this model, controller 220 may calculate, estimate or otherwise determine the pixel values for the prime modulator 216 to modify the light field to produce the final projected/rendered image. Light 213 may thereafter be transmitted through projections optics 218 to form a final projected/rendered image on a projector screen (not shown). OFF light may be dumped to offstate light 211.

In many embodiments, a final image may be produced that is the product of the defocused half-tone image and the prime modulator image. In such a final image, contrast may be in the range of 200,000:1.

As mentioned, in operation, the projector system of FIG. 2 may operate in various fashions: e.g., as a time-division or pulse-width modulator, operating two or more DMDs and/or reflectors in series—both acting as pulse-width modulators. Such operation tends to require precise time-division alignment and pixel-to-pixel correspondence of time-division sequencing.

As such the projector display system of FIG. 2, may employ the first DMD/reflector 208 as a "pre-modulator" or "premod modulator" and may spatially modulate a light source by means of a halftone image that may be maintained for a desired period of time (e.g., a frame or a portion thereof). This halftone image may be blurred to create a spatially-reduced-bandwidth light field that may be applied to the second DMD/reflector 216. The second DMD/reflector—referred to as the primary modulator—may pulse-width modulate the blurred light field. This arrangement may tend to avoid both requirements mentioned above—e.g., the precise time-division alignment and/or the pixel-to-pixel correspondence. In some embodiments, the two or more DMDs/reflectors may be frame-aligned in time, and approximately spatially frame-aligned. In some embodiments, the blurred light field from the premod DMD/reflector may substantially overlap the primary DMD/reflector. In other embodiments, the spatial alignment may be known and accounted for—e.g., to aid in image rendering performance.

In one embodiment, the projector system may create a binary halftone image, which may be smoothed by optical components to create a reduced bandwidth version of the desired display image. The shape of the optical component PSF may determine the properties of the smoothing function. The shape of the PSF may influence display performance and the computational requirements of the system. In many embodiments, PSF shaping may have one or more of the following attributes and/or the following guidelines:

(1) the PSF may smooth the sparest halftone pattern to a relatively flat field. This may impose an approximate lower bound on the size of the PSF;

(2) larger PSFs may reduce the spatial frequency at which dual modulation is active and may result in larger "halos" (as discussed further herein). This may require larger computational costs;

(3) the PSF may have limited bandwidth and limited rise-times. Higher bandwidth and rise-times may require greater compensation accuracy and limit computational approximations;

(4) the PSF may be compact and the PSF spatial extent may be limited. The PSF may decay to zero. A slow decay, or strong PSF "tails", may limit image contrast and increase computational requirements;

(5) the PSF may be substantially radially symmetric. Any asymmetry may be accounted for in the computation.

In one embodiment, the optically blurred PSF may substantially assume the shape of a Gaussian, or a revolved raised-cosine function, or some other substantially radially symmetric peaked function with limited spatial extent or the like. In many embodiments, the PSF should assume limited spatial frequency, limited rise times and/or limited spatial extent. Spatial frequency and rise times may be usually correlated. Excessive spatial frequency or rise times may require denser sampling and greater modeling precision, increasing computational requirements. If the PSF varies over the image frame, a set of PSFs may be used, and a PSF interpolation method may be employed. PSFs with high spatial frequencies that change with PSF position may require a denser model set for proper interpolation, increasing computational requirements and calibration complexity. It may not be desirable to have sharp spikes or ridges on the PSF pulse. Also, it may be desirable the PSF should gradually decay at its perimeter rather than end abruptly there. A smooth shape will have lower spatial frequencies and longer rise times. The spatial extent of the PSF may determine the size of computation operators. PSFs with broad decaying "tails" may increase operator size and therefore computational requirements.

In merely one exemplary embodiment, the PSF represents the blur function that is applied to—e.g., a 5×5 dither pattern. So, the PSF may be large enough to produce a relatively flat field from a halftone image comprising a 5×5 grid of ones, with all other halftone pixels zero. If the blur function has a substantially Gaussian shape or the like, then its diameter may range from 10 pixels to 20 pixels. In this example, a lower and upper bound may be specified that limits the shape of the PSF. The lower bound may be a raised-cosine pulse and the upper bound may be a Gaussian pulse.

For merely one example, let LB be the lower bound and UB the upper bound. Let "r" be the distance from the center of the PSF, and N the size of the side of the dither pattern, both in pixels. The pulse amplitude may then be normalized to the center value, as follows:

$$LB(r)=0.9(\tfrac{1}{2}+\tfrac{1}{2}\cos(\pi r/N)) \text{ for } r<N$$

$$LB(r)=0 \text{ for } r \geq N$$

$$UB(r)=1.1 \exp(-(r/N)^2)$$

As may be noted, the lower bound decays to zero and the upper bound decays as a Gaussian. The decay is significant to avoid the accumulation of too much light from PSF tails. It will be appreciated that many other PSF shapes and functions are possible and that the scope of the present application encompasses all such variations.

Figure 3:
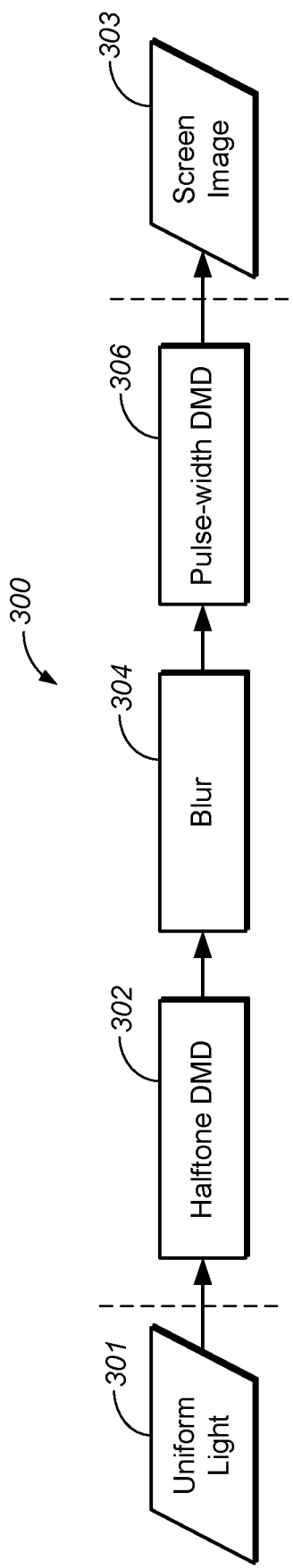
FIG. 3 depicts one embodiment of a high level diagram of the optical processing/image processing that may be affected by the dual, multi-modulator display system.

Referring attention to FIG. 3, FIG. 3 depicts one embodiment of a high level flowchart 300 for operation of the optical processing/image processing that may be affected with a dual, multi-modulator display system, such as depicted in FIG. 1. Uniform light 301 may be input into the display system and a first modulator 302 (e.g., half-tone DMD or other modulator) provides a half-tone image to blurring optics 304. Thereafter, blurred image may be received by second modulator 306 (e.g., pulse-width DMD or other modulator) further modulates the blurred image to produce screen image 303. In one embodiment, flowchart 300 tracks a set of processor-readable instructions that may be stored in system memory in a controller. A controller may receive image data, produce a half-tone image (e.g. at 302), blur the half-tone image (e.g., at 304) and further modulate the image (e.g., at 306) to produce a final image.

In the context of the display system of FIG. 1, the codewords to each DMD device may be employed as two variables available to control the images produced. In one embodiment, the blur function may be performed by an optic system and may be assumed to be constant for all images. In various display system designs, the design of the blur function and the method of halftone encoding may be related and affect the performance of the display. In one such exemplary system, the following objectives/assumptions might be considered in order to determine a suitable choice of halftone encoding and blur function follow:

(1) No bright clipping: In one embodiment, the blurred light field incident on the primary modulator/DMD may be everywhere greater than the input image, the desired screen image. The primary modulator/DMD may attenuate the light field.

(2) Small halo: Halos are dark clipping around a bright object on a dark background. Given that a small bright object on a black background is not bright clipped, the blurred light field at the bright object may be greater than the bright object. Because the light field may have reduced spatial bandwidth, it may not be dark very near the bright object. The level of the light field close to the bright object may be reduced by the primary DMD as much as possible, but might still be greater than the desired screen level, causing dark clipping. In some cases, the dark clipping may represent elevated levels above true black, often exhibiting loss of dark detail and loss of contrast. Halos are the primary visual artifact caused by dark clipping, but dark clipping may occur in any local region where the blurred light field cannot represent a high-contrast, high frequency pattern. The spatial extent of a local region may be determined by the bandwidth of the light field which may be determined by the size of the blur kernel or PSF.

(3) Adequate local contrast: The bandwidth of the light field may be determined by the size of the blur PSF. A smaller PSF allows for a higher bandwidth light field. But a smaller PSF must be paired with a denser halftone pattern. A denser halftone pattern may be associated with a smaller dither pattern size; it may have fewer discrete levels and a higher first non-zero level.

(4) The above objectives may compete. As such, many variations and/or embodiments may be possible and/or desirable. This will be discussed further herein with respect to DMD contrast ratios, PSF size and local contrast considerations.

Table 1 below shows one exemplary 10×10 pattern showing the level indexes. For a given level index, the numbered pixel and all lesser numbered pixels are turned ON while all greater numbered pixels are OFF. When a given level pattern is blurred, the result tends not to be flat and the modulated field may have some minimum. Table 2 below shows the normalized minimum light levels for the each level index of Table 1—showing the light level for the previous index. It will be appreciated that other pattern sizes and other spatial dithering patterns are possible and are encompassed by the present application.

TABLE 1

Spatial Dither Pattern Exemplary

| 1 | 93 | 17 | 69 | 33 | 4 | 96 | 20 | 72 | 36 |
|---|---|---|---|---|---|---|---|---|---|
| 61 | 37 | 77 | 29 | 89 | 64 | 40 | 80 | 32 | 92 |
| 13 | 85 | 5 | 45 | 53 | 16 | 88 | 8 | 48 | 56 |
| 73 | 25 | 65 | 97 | 21 | 76 | 28 | 68 | 100 | 24 |
| 49 | 41 | 57 | 9 | 81 | 52 | 44 | 60 | 12 | 84 |
| 3 | 95 | 19 | 71 | 35 | 2 | 94 | 18 | 70 | 34 |
| 63 | 39 | 79 | 31 | 91 | 62 | 38 | 78 | 30 | 90 |
| 15 | 87 | 7 | 47 | 55 | 14 | 86 | 6 | 46 | 54 |
| 75 | 27 | 67 | 99 | 23 | 74 | 26 | 66 | 98 | 22 |
| 51 | 43 | 59 | 11 | 83 | 50 | 42 | 58 | 10 | 82 |

TABLE 2

Normalized Minimum Light Levels for Table 1 Pattern

| 0 | 0.919914 | 0.159947 | 0.679884 | 0.319955 | 0.029713 | 0.949726 | 0.189717 | 0.709671 | 0.349671 |
|---|---|---|---|---|---|---|---|---|---|
| 0.599925 | 0.35989 | 0.759885 | 0.279915 | 0.879896 | 0.62969 | 0.389651 | 0.789665 | 0.309641 | 0.909666 |
| 0.119936 | 0.839911 | 0.039901 | 0.439936 | 0.519923 | 0.149697 | 0.869623 | 0.069613 | 0.469654 | 0.549684 |
| 0.719902 | 0.239875 | 0.639914 | 0.959919 | 0.199903 | 0.749686 | 0.269715 | 0.669626 | 0.989631 | 0.229615 |
| 0.479913 | 0.399908 | 0.559908 | 0.079919 | 0.799928 | 0.509626 | 0.429714 | 0.589671 | 0.109678 | 0.829687 |
| 0.019936 | 0.939929 | 0.179932 | 0.699874 | 0.339925 | 0.009668 | 0.929686 | 0.169673 | 0.689643 | 0.329627 |
| 0.619936 | 0.379903 | 0.7799 | 0.299927 | 0.899886 | 0.609645 | 0.369611 | 0.769624 | 0.289596 | 0.889622 |
| 0.139927 | 0.859917 | 0.05989 | 0.459925 | 0.539903 | 0.129655 | 0.849579 | 0.049569 | 0.449609 | 0.529644 |
| 0.73988 | 0.25989 | 0.65992 | 0.979956 | 0.21991 | 0.729642 | 0.249675 | 0.649582 | 0.969587 | 0.209571 |
| 0.499944 | 0.419922 | 0.57992 | 0.099932 | 0.819934 | 0.489581 | 0.409674 | 0.569627 | 0.089634 | 0.809642 |

In this embodiment, for any particular input pixel, the level of the corresponding pixel of the blurred halftone image should be greater. To achieve the desired greater level at that pixel, all nearby pixels of the input image within the spatial extent of the blur kernel may be evaluated—e.g., any of those nearby pixels with a level less than the desired level may be turned ON. One embodiment of this method may be affected as follows:

For any particular input pixel, choose a level index such that the level of the full-frame light field is greater than the pixel level. For example, it is possible to choose a level index—e.g., for the entire frame—that creates a halftone pattern that, when blurred, exceeds the pixel level.

Given this full-frame halftone pattern, all pixels whose PSFs do not contribute light to the particular pixel may be turned OFF without affecting the level at the particular pixel.

It should be noted that this method may not produce halftone tiles with particular levels, giving the halftone image a blocky appearance. Rather, individual pixels may be turned ON or OFF, depending on their index and proximity to image features. In other embodiments, it may be possible to affect error diffusion and/or local blue noise—e.g., where the halftone grid may be locally thresholded by the corresponding pixel.

It should be appreciated that while one embodiment may be affected by an ordered dithering, it may be linked with a dilation to achieve an upper-bound. Smoothness may be a concern at the lowest levels—e.g., such as only one pixel on for the dither pattern. It may be possible to apply other approaches, such as blue noise and/or FM-dithering, for different smoothness effects. For another example, consider a small bright object at less than full brightness on black background. In this case, the halo introduced may be wider than desired. The dilation area may not be fully populated with ones. A more compact area with all ones may show less of a halo because halo width of the display is greater than eye glare width. Reducing the brightness of small bright objects may reduce halo width, rather than just reduce halo brightness.

Figure 4:
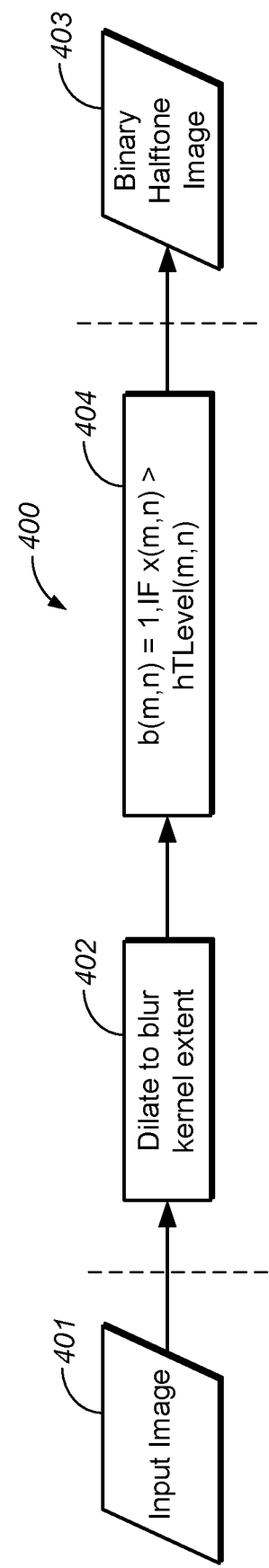
FIG. 4 depicts one embodiment of a method for producing a suitable binary halftone image.

FIG. 4 shows one embodiment of a method for producing a suitable binary halftone image. Halftone image module 400 may receive input image data 401 and may dilate the image data to the extent of the blur kernel at 402—to produce x(m,n), the dilated input image. The resulting binary half-tone image, b(m,n), may be set to b(m,n)=1, if x(m,n)>htLevel(m,n)—where htLevel(m,n) may be given as the values in Table 2 as the map—e.g., tiled over the entire image frame. The binary half-tone image may be returned as b(m,n).

In one embodiment, the dilation operator may be employed to achieve close to the min upper bound. Other embodiments may employ nonlinear filters that may provide a max of elements under the kernel.

The primary modulator/pulse-width DMD modulates the blurred halftone image light field to produce the desired screen image. The Pulse-width DMD can only attenuate light—so the light field may be an upper bound on the desired screen image to prevent bright clipping. In addition, to prevent dark clipping, the light field may be a minimum upper bound. The blurred halftone image light field may be computed, estimated or otherwise modeled using a model of the optical process. In one embodiment, the optical process may be assumed to be only the blur—e.g., the pre-modulator-to-primary modulator alignment may be ignored. In some embodiments, this may be the overall registration error.

In other embodiments, such alignment may be taken into consideration and produce a correction factor to be applied. For example, on a real display, the blurred light field frame created by the premod DMD may not be perfectly aligned with primary DMD frame. For example, the light field image may be slightly rotated, shifted, or scaled to provide overscan at frame edges. It may also be warped due to the blur optic and other optics. For such possibilities, a premod-to-primary map that maps points on the premod DMD to points on the primary DMD may be measured and applied as a mapping—e.g., as a Look-Up Table (LUT) or the like.

Figure 5:
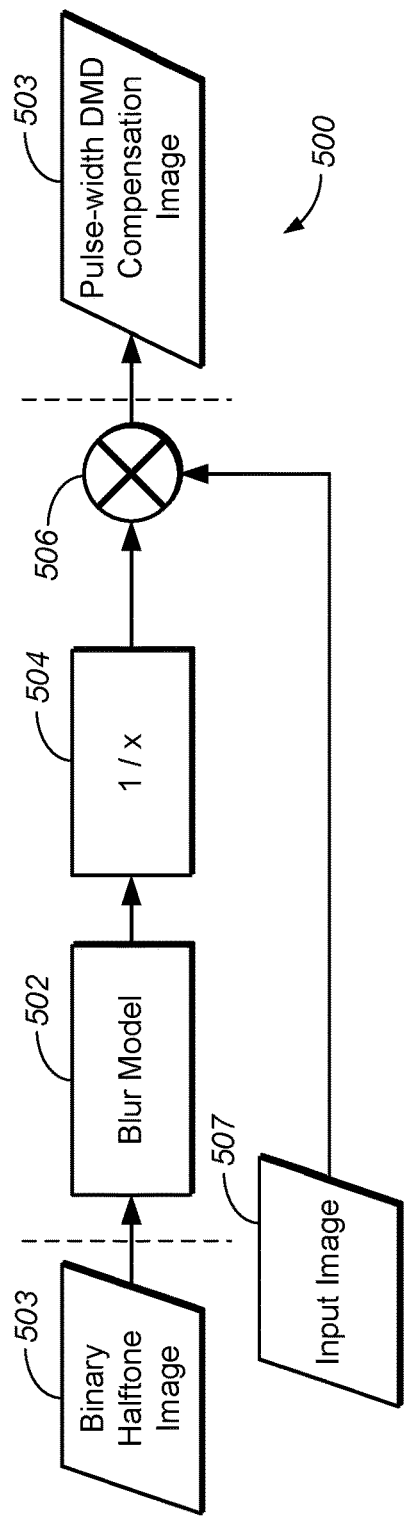
FIG. 5 depicts one embodiment of a technique for generating a pulse-width DMD compensation image.

FIG. 5 depicts one embodiment of a technique for generating a pulse-width DMD compensation image, 503. Binary half-tone image (403, e.g., from FIG. 4) may be input into a blur model 502 and may be reciprocated at 504. The pulse-width DMD compensation image may be determined by dividing the input image by the modeled blurred halftone image light field—e.g. multiplying (at 506) the input image 501 by the reciprocal of the blurred half-tone image light field.

On the real display, the PSF shape for a given premod pixel may depend on its position on the premod frame. The blur optic may not blur all premod positions the same. The PSF for pixels in a local area may be assumed to vary little and all pixels may be assumed to have the same energy (e.g., given a uniform light field incident on the premod). However, on a real display, each PSF may tend to be different. In one embodiment, for a 2K frame, each PSF may be modeled separately, and/or applied to a local portion of the image area—e.g., resulting in 2 million PSFs that might be captured, stored, modeled, and used computationally. Other embodiments may provide a simplifying model to reduce this complexity. Because the PSFs in a local region tend to be similar, a single PSF model is used to represent all PSFs—e.g., at least in local areas and/or local portions of the image area. Such, potentially localized, PSF models may be measured or otherwise modeled to provide suitable PSF models.

The primary DMD compensates the blurred light field to produce a final screen image. In one embodiment, light field compensation may be performed on the primary DMD pixel grid. For this compensation process, the blurred light field may be represented on the primary pixel grid. However, the light field is formed by blurring the halftone image which is on the premod pixel grid. In addition, the premod and primary modulators may not be aligned.

To affect a suitable compensation process, there are two possible alternative embodiments from which to choose. A first embodiment might be to model the light field on the premod grid and then map it to the primary grid. A second embodiment might be to model the light field on the primary grid by modeling the PSFs associated with each premod pixel on the primary grid. While the present application encompasses both alternative embodiments, it will now be described the first embodiment—i.e., to modeling the light field on the premod grid and map it to the primary grid. In one embodiment, it may be possible to map points on the primary grid accounting for geometric and/or optic distortions.

This first embodiment may be selected for the following reasons:
(1) because the PSF may substantially maintain its shape in a local area. Thus, the light field may be modeled in the local area on the premod by a standard convolution process on the halftone image using a single PSF for the entire area.
(2) because of the premod-to-primary misalignment, the PSFs in a local area on the primary may have different sample phases and these may need to be accounted for. In some embodiments, because the premod and primary may not be aligned, there may be some sample-phase shift moving the inherently premod-grid-aligned PSF models to the primary grid.
(3) If modeled on the primary, even though the PSF shape does not change in a local area, different PSFs may need to be used when computing the convolution because of the sample phase change.
(4) The PSFs are inherently premod referenced. More PSFs would need to be modeled and recorded for the primary than for the premod.
(5) Modeling the light field may tend to be computationally costly. For a practical implementation, the PSFs may need to be subsampled and approximated. This might be simpler if performed on the premod grid.
(6) Mapping the modeled light field from the premod to the primary has a computational cost, but it may be less than the cost of modeling the light field on the primary.
(7) Modeling the light field on the premod may be affected by mapping the modeled light field from the premod to the primary. It may be desirable that this map be accurate. For a particular display, the premod-to-primary alignment is fixed. If the map has errors, they may be fixed. For example, the errors may be accounted for by modifications to the PSFs during the calibration process—e.g., an offset error in the map may be countered by an offset in the PSF model at that frame position.

Figure 6:
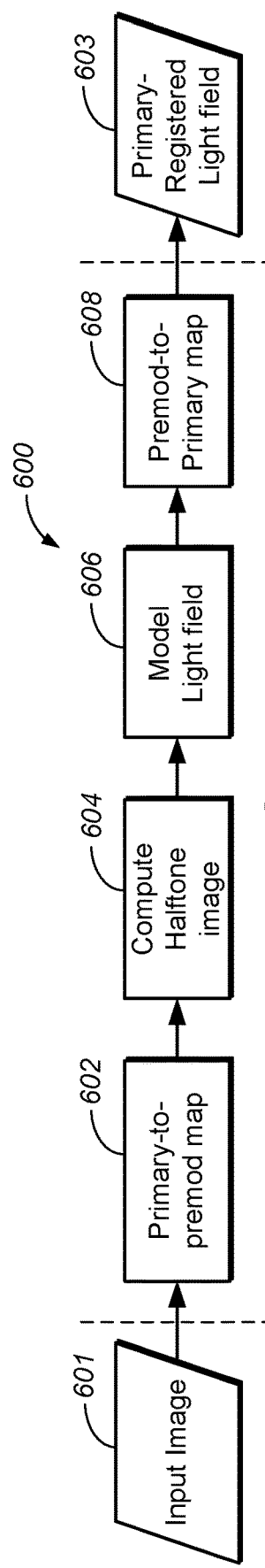
FIG. 6 is one embodiment of a flow diagram of using premod-to-primary maps, light field models and primary-to-premod maps to produce a primary registered light field.

In addition, because of premod-to-primary misalignment, the input image may be mapped to the premod grid for the process of computing the halftone image. This process may not require as much accuracy as mapping the light field to the primary. FIG. 6 depicts the afore-mentioned first embodiment. The system—under controller direction—may receive input image 601. A primary-to-premod mapping 602 may be applied prior to computing the half tone image at 604. A light field model may be applied at 606 and then a premod-to-primary map at 608 may be applied to produce a primary registered light field 603. In some embodiments, the primary may be one resolution (e.g., 4K) and the premod may be another resolution (e.g., 2K); but processing may be able to affect other mappings. For example, the processing may affect 2K/2K mapping—but the 2K primary may be upconverted to 4K by the projector system. Other mappings are, of course, possible DCI Content Mapping for EDR Projection Embodiments Having now discussed several embodiments of EDR projector systems, it will now be discussed how such EDR projector systems may handle an input data stream that may comprise different image data formats. Thus, however a given EDR projector system may be architected (e.g. as in the embodiments of FIG. 1, FIG. 2 or otherwise), many embodiments of the present application are able to input image/video data, which may comprise both EDR image/video data and/or DCI-specified images and/or video content.

As noted, EDR projection systems have the potential to significantly improve rendering performance—as compared to a standard DCI (Digital Cinema Initiative) projector. Display of standard DCI content is typically designed and graded for projectors that meet the DCI projector specification. These projectors have a more limited dynamic range and color space than the EDR projector. For example, even though DCI specifies a minimum 2000:1 sequential contrast ratio for the projector, in practice few projectors exceed this value and thus all grading is usually done with an approximate contrast ratio of 2000:1.

In order to properly display DCI content without artifacts (e.g., dark noise, dark contouring etc.) the EDR projector should have a "DCI Mode" that provides an experience that is identical, or at least similar to the standard DCI projector. It may be desirable to provide an improved experience, but it must be without any objectionable artifacts, and be in line with the artistic intent of the content creator.

Figure 7:
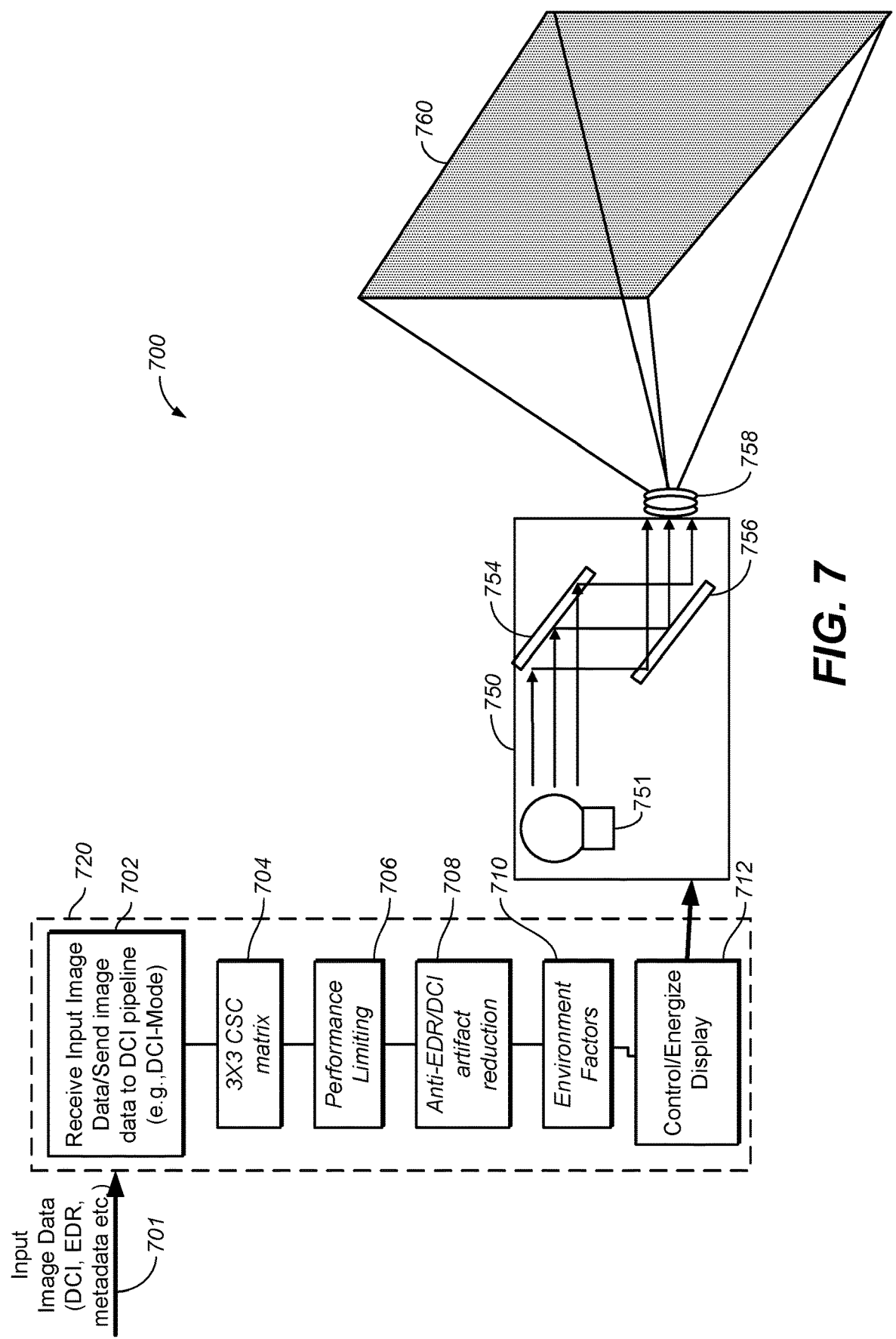
FIG. 7 is one embodiment of a DCI-mode image processing pipeline as made in accordance with the principles of the present application.

FIG. 7 depicts one embodiment of EDR projector system 700 that further comprises image and/or video processing modules that may effectively render both EDR and DCI image and/or video data 701 as input—that may also provide a DCI mode, as mentioned above. Projector 750 broadly comprises light source 752 and dual modulators 754, 756 that transmit light through projector optics 758 and onto screen 760. Projector 750 may be architected in the fashion of FIGS. 1 and 2 described above—or in any manner that may affect rendering of EDR images/video.

FIG. 7 also depicts one embodiment of a video/image pipeline 720. At 702, the pipeline accepts input data and/or metadata 701 and may detect whether the present input is EDR, DCI or any other data format. The system may determine if the input image data is DCI format, EDR format and/or any other format in a number of ways. One possible way is to detect any metadata that is associated with the input image data. Metadata and/or tags may inform the system with which format the image data is compliant. Another possible way is for the controller/system to assay the image data and detect whether the image data is within DCI parameters (e.g., color gamut, luminosity, etc.). The controller/system may also detect any possible change in input image data parameters to automatically detect image formats.

If pipeline is currently receiving DCI compliant image/video data at 702, then pipeline 720 may perform all or any of the following processing modules, in order to properly render the final image onto screen 760. Module 704 may perform a desired gamut mapping and/or color space conversion (e.g., via a 3×3 matrix—or any other known techniques of gamut mapping). In one embodiment, module 704 may employ metadata to determine the color space of the image data. Alternatively, module 704 may determine color space by data testing. As will be discussed in greater detail below, the color space conversion may be desirable and, in large measure, guided by the architecture of the projector system. For example, if the projector system is illuminated by a bank of laser sources, then the gamut mapping may help to improve the viewer's experience and perception of the final image.

Module 706 may provide a variety of dynamic range mapping techniques, depending on the architecture of the projector system—as well as desired visual effects. For example, in one embodiment, module 706 may determine the desired performance based upon the metadata. Such performance may be a limitation of the process used to generate the image data. Module 708 may effect artifact reduction that might arise from rendering DCI-specified content on an EDR projector system, as will be discussed further herein. Module 710 may affect a number of techniques that are directed at the visual environment conditions in the viewing area. These environmental conditions may include room ambient data, (e.g., the ambient light level and ambient color)—as well as room reflectance data (e.g., reflectance color and magnitude—as light from the screen may be reflected by the walls or other objects back to the screen).

It will be appreciated that module 710 may be employed in projected systems, other than dual or multi-modulator display system (e.g., high performance and/or high f-number display systems, or any other systems which may exceed DCI specifications). For example, a 4K highly collimated laser projection system (e.g., large format digital equivalent) would also suffice. At 712, controller 720 may send control and/or data signals to the EDR projector in order to render the final image on screen 760. For example, controller may control and/or energize any suitable display, e.g., an EDR dual modulation display or other high performance display system.

It will be appreciated that different light sources may apply to various embodiments of projector systems. For example, in various embodiments, light source 751 may comprise any suitable light source—e.g., Xenon lamp, lasers, LEDs, nanotube-based light sources. In addition, the light source may exhibit a native polarization, could be based on phosphors or other light emitting materials or light converting materials such as quantum dots.

In many embodiments, the functionality of Module 710 may be configured to operate on separate images that are later combined. Such combinations may be electronic (e.g., image data product) or projected in a manner to form a complete image. The images may be, for example, left and right channels of a 3D image, or high and low resolution and/or spatial frequency images. Typically, the images are of a same content subject matter of the same frame. For example, left and right view images of the same scene in a 3D image, low and high spatial frequency images of a same frame (same basic picture or image being reproduced, one of the images being composed of mainly low spatial frequency content, the other being composed mainly of high spatial frequency content). In one embodiment, the invention prepares low and high spatial frequency content images for each of left and right channels of a 3D image.

Processing of the images in module 710 may include additional hardware or processing capability including, for example, a downsampler/upsampler, 3D converter, spatial frequency divider/converter or other hardware necessary to produce the different images. Metadata provided with original image data may also be utilized to produce the images or to direct other processing element in producing the different images. The metadata or production of additional images may be produced in a post-production process using, for example, professional display monitor. Alternatively the images may be provided in the original image data-such images may be captured at the source (e.g., different view cameras/capture devices for 3D, and/or low and high spatial frequency cameras capturing a same scene).

The various processes within module 710 may operate individually on the additional images and provide an output. For example, color space conversion may be separately performed and with different parameters for each of the images (e.g., a first set of parameters to process low spatial frequency images and a second set of parameters to process a high spatial frequency image). Once processed the images are output for display. The images may be combined electronically (as a combined set of image data) and displayed or projected for viewing by a viewer.

Alternatively, the additional images may be displayed or projected simultaneously and integrated together when projected and/or viewed. For example, the images may be provided to separate projection systems, a first projection system projecting a low spatial frequency image and a second projection system projecting a high spatial frequency version of the same image. The projections may be simultaneous. The projection systems may be inversely synchronized such that they alternate between projecting low spatial frequency content images and high spatial frequency content images. In one embodiment, quad projectors are utilized and may be each configured to project images of any of different resolutions, spatial frequencies, and/or views (e.g., channels of a 3D image) in any pattern. In one embodiment, quad projectors are utilized to project 3D images the left and right channels being alternated between low and high spatial frequencies and projected from different projectors at different times.

Dynamic Range Processing Embodiments

The EDR projector has a vastly larger dynamic range (100×-1000×) than a standard DCI projector. In addition, an EDR projector may be significantly more luminant than a standard DCI projector—108 nits for EDR projection, compared with 48 nits for DCI projection. Moreover, with a dual modulation DMD-DMD projector (e.g., as in FIGS. 1 and 2), both modulators may be used together—and in varying ways—to create an EDR image.

Figure 8:
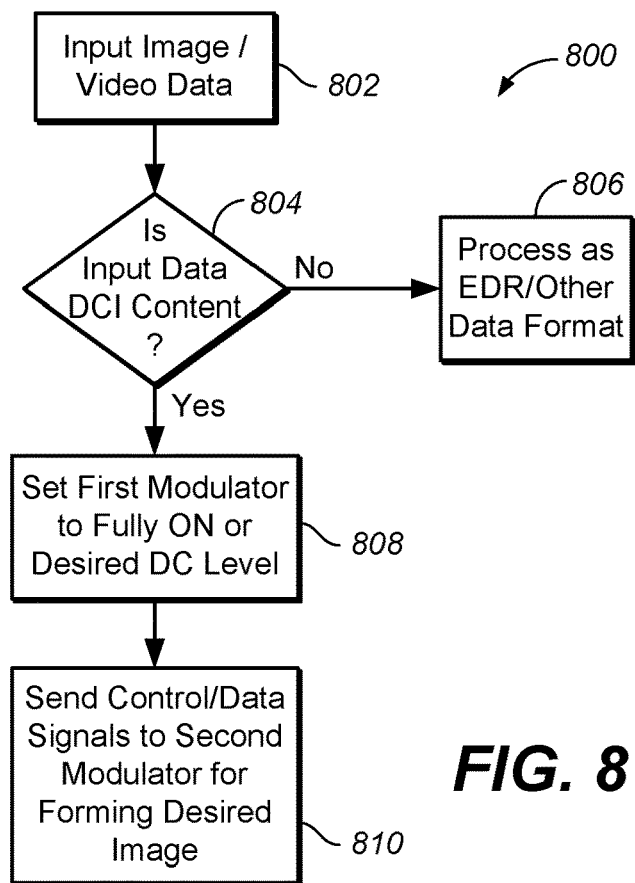
FIG. 8 is one embodiment of a dynamic range processing module as made in accordance with the principles of the present application.

FIG. 8 is one embodiment of a method (800) that may be employed by an EDR dual modulator projector system to handle input data that is DCI-compliant. In one embodiment, this method may be implemented in software, firmware or a combination in the controller of the projector system. At 802, the controller may receive as input a combination of EDR, DCI image/video data—or image/video data of any known format. At 804, the controller and/or system may detect which format the input image data represents. In one case, if the input data is not DCI-compliant, then the system may process the input data according to EDR or other image format known.

If this input image data is DCI-compliant, then, at 808, the controller/system may set the first modulator (e.g. 106 in FIG. 1 or 208 in FIG. 2 as a pre-modulator) to be fully turned ON. This would set the projector system to its potentially maximum luminance. At 810, the controller/system may send control and/or data signals to the second modulator—so as to form the desired image being projected. In this manner, the EDR projector may be used like a single modulator projector, which is sufficient to render DCI-compliant image data.

As this method for making a projector with similar contrast ratios to a DCI projector would be to leave the pre-modulator turned full on, the result would be as a virtual single modulator system, and would tend to have nearly identical dynamic characteristics to the DCI projector. In some embodiments where the EDR projector can reproduce higher light levels, it is possible to adjust the output down to DCI levels, i.e., 48 nits. Thus, suitable control signals may be made to either the light source (e.g., turn down the output of the light source) or—either alternatively or in combination—to set the first modulator to produce a halftone less than fully ON. For example, if the EDR projector employs laser light source, maximum luminance may be in the range of 108 nits. Thus, it may be possible to set the spatial halftone substantially to a ratio of 48/108—or (DCI Max Luminance)/(Max Luminance of the EDR system). It will be appreciated that other desired luminance ratios less than fully ON are contemplated by the present application and the scope of the present application encompasses such other desired ratios. In addition, for other embodiments, It may be possible to consider other maximum luminance projection (e.g., other than 108 nits) and other embodiments are encompassed by the present application.

In operation, if the projector system received a combination of EDR and DCI image content, then the projector system may be able to switch between DCI-mode and EDR-mode, as appropriate. When EDR data is being input and rendered, then the projector system may employ the full range of dual modulator operation, as discussed above. When DCI data is being input and rendered, then the projector system may set the appropriate DC level (e.g., fully ON or otherwise) of the first modulator and employ the second modulator as the image rendering modulator.

Another second method for a dynamic range processing method is to use the dual modulation technique of the projector system, but to add a light floor below which the projector is never allowed to fall. For merely one example, it may be possible to put the floor at $1/1800$ of the peak, which would result in the normal sequential contrast ratio of a good DCI projector. This method provides an image without artifacts, and with some increase in the simultaneous contrast ratio. As before, it may be possible to set the peak output to 48 Nits.

Figure 9:
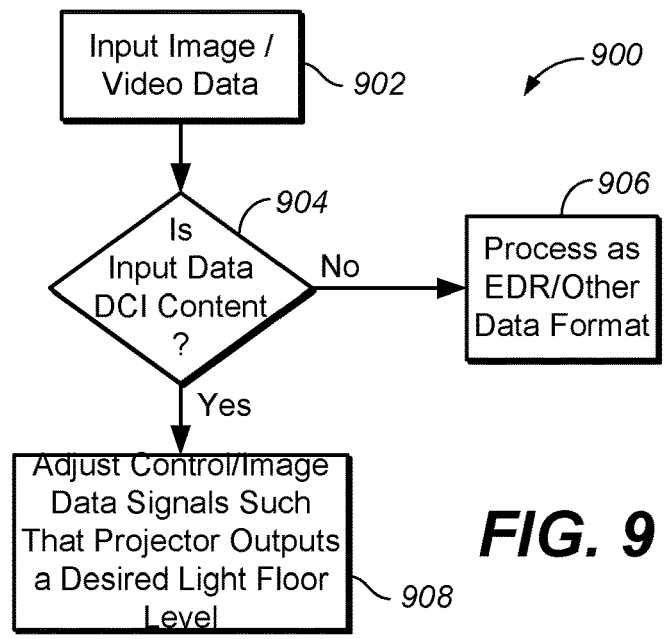
FIG. 9 is another embodiment of a dynamic range processing module as made in accordance with the principles of the present application.

FIG. 9 is one embodiment of this second dynamic range processing method (900). As input image/video data is received at 902, the projector system may determine at 904 whether the input image data is DCI content, EDR content or otherwise. If the content is EDR, then the projector system may determine to process the EDR or other content data as desired at 906. In the case that the input data is DCI content, the projector system may adjust either image data signals, control signal to one or both modulators, light source(s) (or all of the above) in order to affect a light floor level of illumination at 908.

To affect this light floor, there are many possible techniques to use—either singly or in combination. For one possible embodiment, the projector system may alter the image data such that dark regions of the image have their luminance boosted to the light floor level. In another possible embodiment, the projector system may adjust the light ratio of the first modulator to be more than 48/108, as discussed above. In addition, there are other techniques that may be employed to ensure such light floor level. For example, it is possible to turn on the overhead lights in the auditorium to achieve this light floor level.

Extending this idea, the floor could be lowered below $1/1800$ (that is, Contrast Ration (CR)=1800:1) to around $1/5000$ (CR=5000:1) without encountering serious artifacts or serious changes to the artistic intent. For CRs between 5000:1 and 50000:1, artifacts may become visible and the artistic effect/intent may tend to shift. Thus, for some embodiments, it may not be desired to have the CR greater than 50000:1—as the artistic intent is likely to shift. Possible artifacts may comprise be black clipping, noise and grading errors. Inconsistencies in the grading or any conversion and/or processing of the grading and/or graded image data may tend to become visible.

Yet another third method for dynamic range processing may be to use an inverse tone mapping technique that analyses the DCI image data and dynamically adjusts the picture based upon a mapping algorithm. Techniques as disclosed in the following co-owned application may be employed to effect an inverse tone mapping and/or dynamic picture adjustments:

(1) United States Patent Application 20130148029 to Gish et al., published on Jun. 13, 2013 and entitled "EXTENDING IMAGE DYNAMIC RANGE"; and (2) United States Patent Application 20130076763 to Messmer, published on Mar. 28, 2013 and entitled "TONE AND GAMUT MAPPING METHODS AND APPARATUS".

all of which are incorporated by reference herein in their entirety.

Color Space Processing Embodiments

Figure 10:
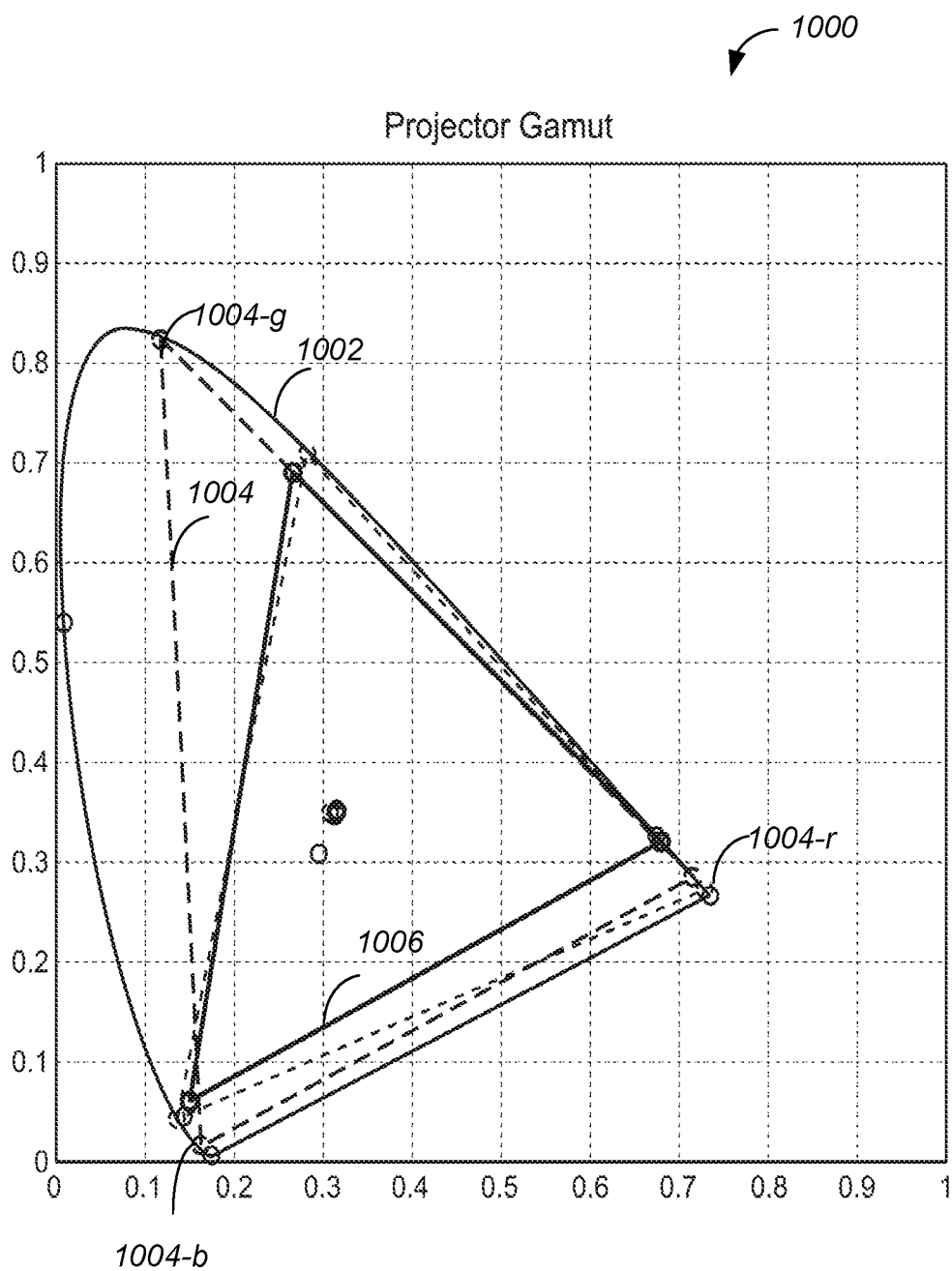
FIG. 10 is a representation of a color gamut map of an EDR projector system as compared with DCI P3 color gamut map.

The EDR projector has a larger color space than the DCI projector. FIG. 10 is a color gamut map 1000, depicting the DCI-standard color gamut (also known as P3) 1006 within the context of the CIE 1931 chromaticity diagram 1000—with 1002 being the spectral locus. In several embodiments of the EDR projector system (e.g., FIG. 2), the light source may comprise a single wavelength sources that may further comprises two or more single wavelength sources that are relatively spaced close together.

For example, one embodiment may have a red laser light course 1004-*r* or alternatively, two red laser light sources (e.g., splitting 1004-*r* into 1004-*r*1 and 1004-*r*2), one or two green laser light sources (e.g., splitting 1004-*g* into 1004-*g*1 and 1004-*g*2) and one or two blue laser light sources (e.g., splitting 1004-*b* into 1004-*b*1 and 1004-*b*2)—that define the color gamut 1004 as shown embedded in the CIE 1931 chromaticity diagram.

In various embodiments, it is possible to implement methods that map a wider color space (e.g. 1004) to a narrower one (e.g., 1006). One such method may be a 3×3

CSC (color space conversion) matrix. This could be used to map the native EDR color space into the DCI color space with high accuracy.

In another embodiment, it may be possible to expand the DCI (P3) content into the expanded EDR color space (e.g., 3D LUTs, gamut mapping). In many embodiments, it would be desirable to avoid creating undesirable artifacts (e.g., color shifts, excessive saturation) while performing color expansion. Several color space processing techniques may be found in many of the above-incorporated by reference co-owned patent applications.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method comprising:
receiving, with a controller of an Enhanced Dynamic Range (EDR) projector system, input data, the EDR projector system including a first modulator and a second modulator;
determining, with the controller, whether the input data includes Digital Cinema Initiative (DCI)-compliant image data;
responsive to determining that the input data includes the DCI-compliant image data, creating, with the controller, a virtual single modulator system by producing a flat image on the first modulator; and
controlling, with the controller, the second modulator to modulate light from the first modulator to form a desired image based on the DCI-compliant image data.

2. The method of claim 1, wherein creating the flat image on the first modulator further comprises:
setting a luminance of the first modulator as a function of a ratio of a DCI maximum luminance to a maximum luminance of the EDR projector system.

3. The method of claim 2, wherein the DCI maximum luminance is equal to forty-eight nits and the maximum luminance of the EDR projector system is greater than forty-eight nits and equal to or less than one hundred and eight nits.

4. The method of claim 1, further comprising:
detecting metadata associated with the input data, the metadata indicating that the input data is the DCI-compliant image data, or
assaying the input data to detect a plurality of image data parameters indicating that the input data is the DCI-compliant image data.

5. The method of claim 1, wherein controlling, with the controller, the second modulator to modulate the light from the first modulator to form the desired image based on the DCI-compliant image data further comprises:
rendering the desired image with a desired minimum level relative to a full luminance output of the EDR projector system.

6. The method of claim 5, wherein the desired minimum level is substantially $1/1800$ of the full luminance output of the EDR projector system.

7. The method of claim 1, further comprising:
performing gamut map of the DCI-compliant image data to a desired color gamut.

8. The method of claim 7, further comprising:
expanding the DCI-compliant image data to a full color gamut of the EDR projector system.

9. The method of claim 1, further comprising:
responsive to determining that the input data does not include the DCI-compliant image data, determining, with the controller, whether the input data includes second image data in a format that is different from a DCI-compliant format;
responsive to determining that the input data includes the second image data that is in the format that is different from the DCI-compliant format, producing, with the controller, a half-tone image on the first modulator based on the second image data; and
controlling, with the controller, the second modulator to modulate second light from the first modulator to form a second desired image based on the second image data.

10. The method of claim 9, wherein the second image data is Enhanced Dynamic Range (EDR) image data.

11. The method of claim 1, wherein the flat image is created in response to determining that the input data includes the DCI-compliant image data and is not based on the DCI-compliant image data.

12. A device comprising:
a first modulator;
a second modulator; and
a controller configured to
receive input data,
determine whether the input data includes Digital Cinema Initiative (DCI)-compliant image data,
create a virtual single modulator system by producing a flat image on the first modulator in response to determining that the input data includes the DCI-compliant image data, and
control the second modulator to modulate light from the first modulator to form a desired image based on the DCI-compliant image data.

13. The device of claim 12, wherein, to create the flat image on the first modulator, the controller is further configured to:
set a luminance of the first modulator as a function of a ratio of a DCI maximum luminance to a maximum luminance of an Enhanced Dynamic Range (EDR) projector system.

14. The device of claim 12, wherein the controller is further configured to:
detect metadata associated with the input data, the metadata indicating that the input data is the DCI-compliant image data, or
assay the input data to detect a plurality of image data parameters indicating that the input data is the DCI-compliant image data.

15. The device of claim 12, wherein, to create the flat image on the first modulator, the controller is further configured to:
set the first modulator to a desired luminance level.

16. The device of claim 15, wherein, to control the second modulator to modulate the light from the first modulator to form the desired image based on the DCI-compliant image data, the controller is further configured to:
render the desired image with a desired minimum level relative to a full luminance output of an Enhanced Dynamic Range (EDR) projector system.

17. The device of claim 12, wherein the controller is further configured to:
determine whether the input data includes second image data in a format that is different from a DCI-compliant format in response to determining that the input data does not include the DCI-compliant image data,
produce a half-tone image on the first modulator based on the second image data in response to determining that the input data includes the second image data that is in the format that is different from the DCI-compliant format, and
control the second modulator to modulate second light from the first modulator to form a second desired image based on the second image data.

18. The device of claim 17, wherein the second image data is Enhanced Dynamic Range (EDR) image data.

19. A method comprising:
receiving, with a controller of an Enhanced Dynamic Range (EDR) projector system, input data, the EDR projector system including a first modulator and a second modulator;
determining, with the controller, whether the input data includes Digital Cinema Initiative (DCI)-compliant image data;
responsive to determining that the input data includes the DCI-compliant image data, creating, with the controller, a virtual single modulator system by controlling the first modulator to reflect light at a single desired luminance level; and
controlling, with the controller, the second modulator to modulate the light from the first modulator to form a desired image based on the DCI-compliant image data,
wherein the single desired luminance level is the same across all elements of the first modulator.

20. The method of claim 19, wherein the single desired luminance level is full luminosity of the first modulator.

* * * * *